United States Patent
Dandl

[15] 3,699,752
[45] Oct. 24, 1972

[54] MODULAR CONSTRUCTED ROTARY MOWER

[72] Inventor: John E. Dandl, 211 West 16th Street, Chico, Calif. 95926

[22] Filed: May 17, 1971

[21] Appl. No.: 143,918

[52] U.S. Cl. .................56/13.6, 56/6, 56/15.5, 56/320.1
[51] Int. Cl. ...........................A01d 75/30
[58] Field of Search......56/6, 13.6, 15.5, 17.2, 320.1, 56/320.2

[56] References Cited

UNITED STATES PATENTS

| | | |
|---|---|---|
| 3,068,630 | 2/1962 | Caldwell..........................56/6 |
| 3,473,302 | 10/1969 | Caldwell..........................56/6 |
| 3,387,436 | 6/1968 | Kasper............................56/6 |
| 2,753,674 | 7/1956 | Cunningham, Jr. et al..............................56/6 |
| 3,208,207 | 9/1965 | Bottenberg..................56/6 X |
| 2,720,740 | 10/1955 | Price............................56/6 X |

FOREIGN PATENTS OR APPLICATIONS 973,945 11/1964 Great Britain...................56/6

*Primary Examiner*—Louis G. Mancene
*Assistant Examiner*—J. A. Oliff
*Attorney*—Robert Charles Hill

[57] ABSTRACT

A modular constructed rotary mower is provided with structural module means, a gear box assembly, a depending shaft and a rotary mower blade. Front and rear bars are attached to the structural module means. Hitch means are attached to the front bar and running gear are attached to the rear bar.

7 Claims, 8 Drawing Figures

INVENTOR.
JOHN E. DANDL
BY Robert Charles Hill
ATTORNEY

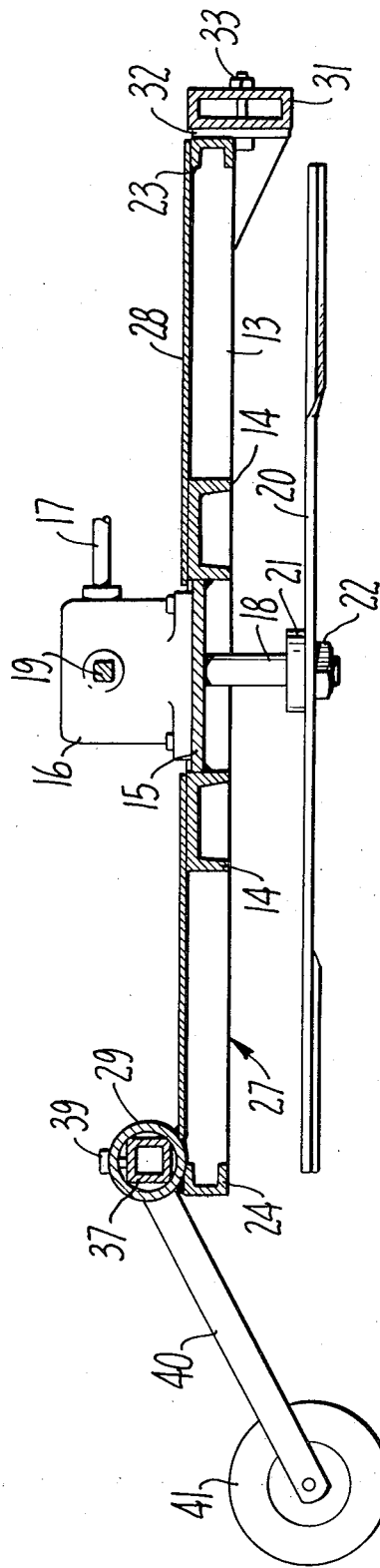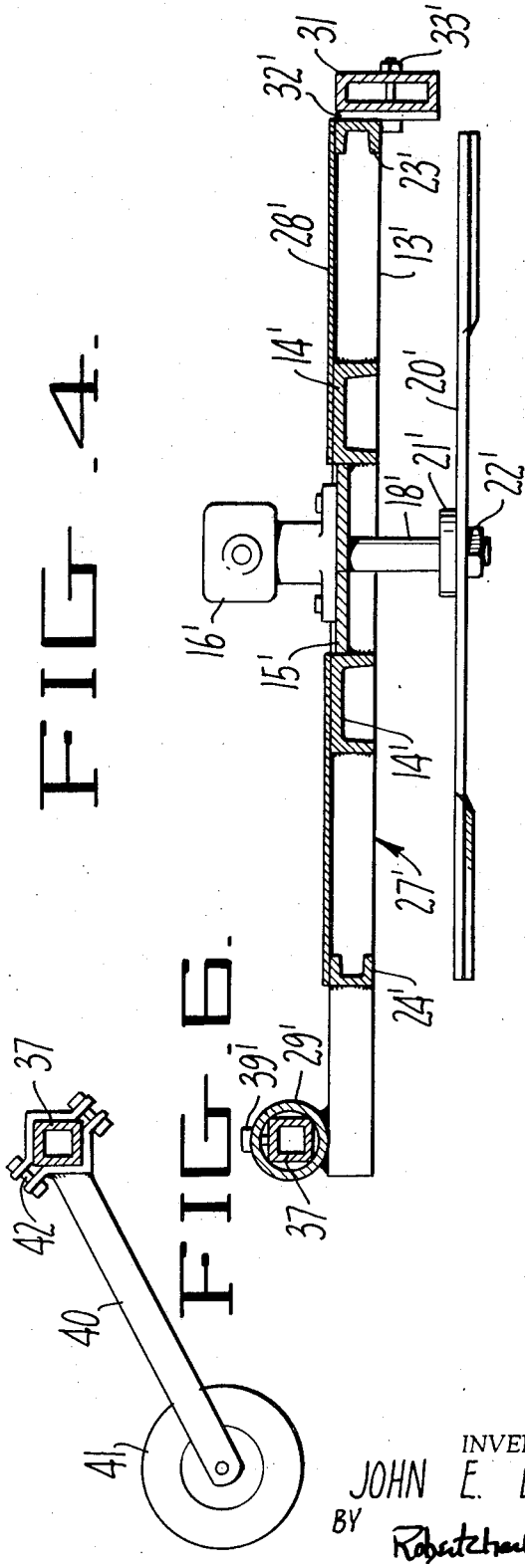
FIG. 4. FIG. 5. FIG. 6.
INVENTOR.
JOHN E. DANDL
BY Robert Charles Hill
ATTORNEY PATENTED OCT 24 1972
3,699,752
SHEET 3 OF 3
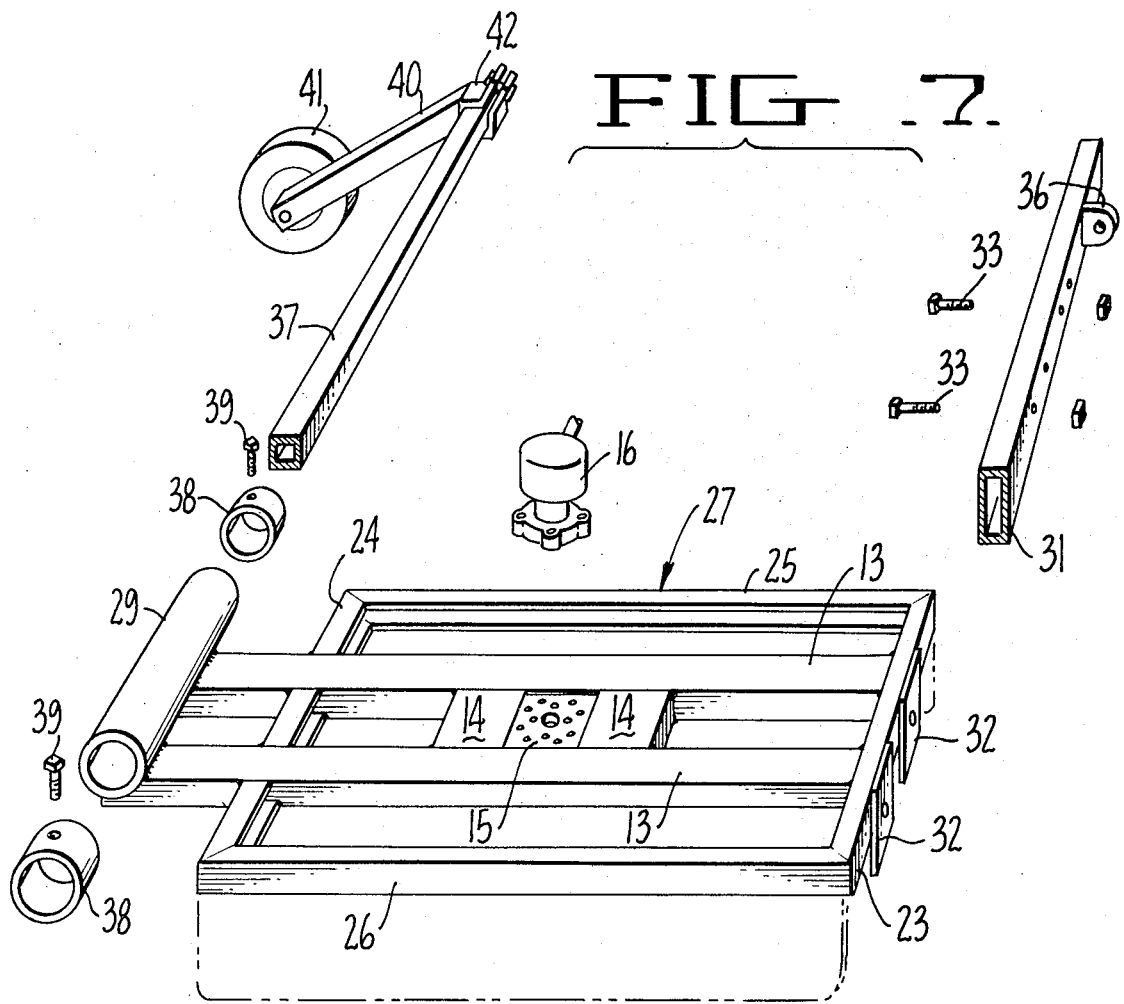
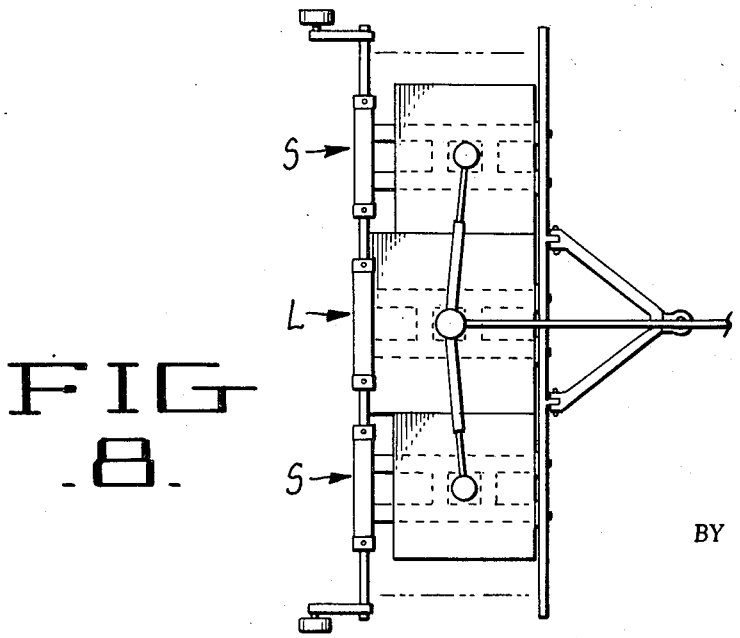
INVENTOR.
JOHN E. DANDL
BY
Robert Charles Hill
ATTORNEY

MODULAR CONSTRUCTED ROTARY MOWER

BACKGROUND OF THE INVENTION

A modular constructed rotary mower is provided with like frame modules, each mounting a rotary blade and adapted for connection together in lateral abutting relationship. The mower can be constructed of modules of different widths whereby selected combinations of such modules provide the desired range of overall machine width. Means are provided for interconnecting the desired modules to provide a unitary machine having integral strength and handling characteristics. Simple and speedy alteration of the mower width is possible with the machine of the present invention.

SUMMARY OF THE INVENTION

This invention relates to rotary mowers which are commonly used in the cutting of grass, weeds, stalks, brush, hay and the like. Generally, it is desirable that such machine be as wide as possible so that a large swath will be cut through the material being mowed. However, a large cutting swath is not practical when mowing between trees or over uneven ground, so that in some instances a narrower machine is required. Thus, it can be seen that great flexibility in the width of a mower is required if one machine is to do many jobs. Another very practical aspect of the present invention is that a farm equipment dealer selling these mowers has great versatility in the stocking of inventory.

It is the primary object of the present invention to provide a rotary mower wherein the size of the cutting width can be quickly and easily increased or decreased.

Another object is to provide a modular constructed rotary mower wherein the modules are connected together in lateral abutting relationship.

A further object of the invention is to provide structure of the character described which is long lasting in usage.

BRIEF DESCRIPTION OF THE DRAWINGS

FIG. 4 is a side elevational view in section of the rotary mower shown in FIG. 1 taken along the line and in the direction indicated by the arrows 4—4.

FIG. 5 is a side elevational view in section of the rotary mower shown in FIG. 1 taken along the line and in the direction indicated by the arrows 5—5.

FIG. 6 is a side elevational sectional view of a portion of the mower shown in FIG. 1 taken along the line and in the direction indicated by the arrows 6—6 in FIG. 1.

FIG. 7 is an exploded perspective view of a part of the mower of the present invention.

FIG. 8 is a plan view of a mower of the present invention in a three-modular configuration.

DESCRIPTION OF THE PREFERRED EMBODIMENT

Figure 1:
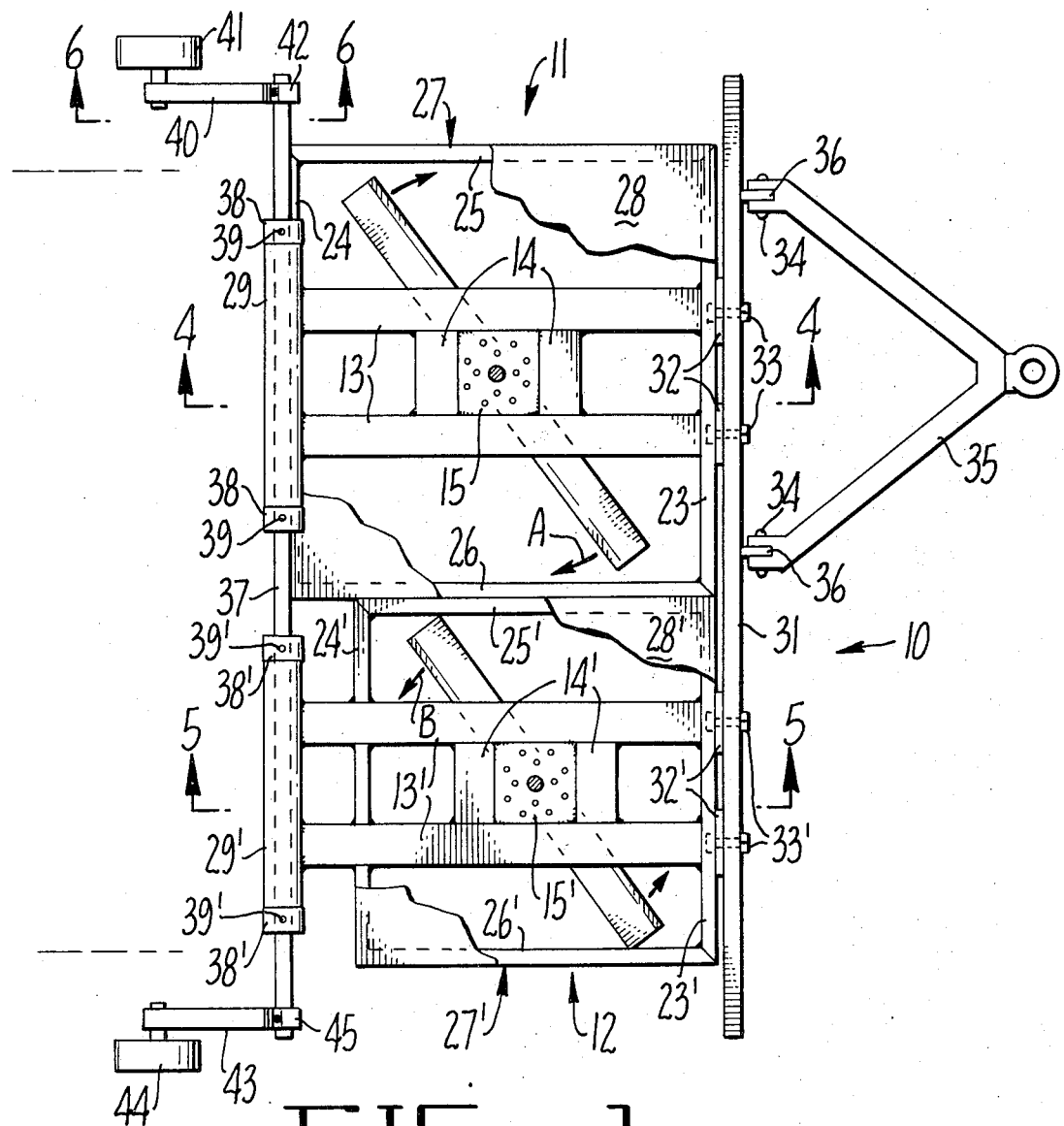
FIG. 1 is a plan view of a rotary mower embodying the present invention with portions of the top plates broken away.

Referring to FIG. 1 of the drawings, there is shown the modular constructed rotary mower of the present invention, generally indicated 10, which is adaptable for many different mowing operations. The rotary mower 10 has modules 11 and 12 which are similar except for size, module 11 being larger than module 12. Accordingly, only module 11 will be described herein below, it being understood that the elements comprising module 11 have counterparts in module 12 which are depicted in the drawings by similar primed reference numerals.

Module 11 has first parallel spaced beam members 13 extending the length of the module and defining the lateral median thereof, and second parallel spaced beam members 14 extending between said first parallel beam members and transverse therewith, said first and second parallel spaced beam members defining an H-frame. A mounting plate 15 is disposed central of the H-frame within the area defined by the intersection of said first and second parallel beam members, and mounts a conventional gearbox assembly 16 shown in FIG. 4. A power transmission means comprising a power shaft 17, adapted for connection to a rotary drive means on a tractor or the like, is received in the gearbox assembly 16 whereby rotating power from the tractor may be employed to drive a blade shaft 18 depending from the gearbox through the mounting plate. The power transmission means further comprises a secondary power drive shaft 19 emerging from gearbox assembly 16 and connected to a similar gearbox assembly 16' mounted in like fashion on adjacent module 12, as shown in FIG. 5. Such gearbox assemblies are well-known in the art and accordingly will not be further described.

A rotary mower blade 20 is mounted on shaft 18 as by a collar 21 and nut 22. As can be seen by arrows A and B in FIG. 1, blade 20 rotates clockwise and blade 20' rotates counterclockwise, and are timed so as not to collide with one another.

Referring again to FIG. 1, module 11 further has lateral parallel front and rear frame members 23 and 24, respectively, at each end of beams 13 and transverse therewith, and longitudinal parallel side frame members 25 and 26, respectively, joining the respective ends of frame members 23 and 24 to form a rectangular frame 27 enclosing the mower blade 20. It is to be noted that frame members 23 and 24 are of the same length as the mower blade 20.

As mentioned above, module 12 has a smaller width than module 11. Accordingly, blade 20' and frame members 23' and 24' are shorter than blade 20 and frame members 23 and 24. However, to provide for interconnection of modules 11 and 12 in accordance with the present invention, it is necessary that they have the same length. Thus, beams 13' are the same length as beams 13. Frame members 25 and 26 are preferably the same length as frame members 23 and 24. Likewise frame members 25' and 26' are the same length as frame members 23' and 24', and thus shorter than frame members 25 and 26. Therefore, frame member 24' will intersect beam member 13' at some intermediate point, although it may be disposed at the ends of beam members 13' if desired.

A plate 28 overlies beams 13 and 14 and frame 27, and together with frame 23, provides a protective housing for the mower blades.

A cylindrical sleeve 29 is attached to the rearward ends of beam members 13 in transverse, overlying relationship therewith.

Two or more modules constructed in accordance with the foregoing description may be readily interconnected to form the modular constructed rotary mower of the present invention.

Referring to FIG. 1, a front bar 31 of desired length is connected to attaching plates 32 and 32' of frame members 23 and 23', respectively, by means of bolts 33 and 33'. Front bar 31 has numerous holes therein to accommodate modules of varying sizes. Pins 34 connect a conventional A-frame hitch structure 35 to forwardly extending lugs 36 located on the front side of front bar 31. Hitch structure 35 in turn connects to a tractor (not shown) or the like.

A rear bar 37 is disposed in coaxial relationship with sleeves 29 and 29' and restrained with respect thereto by collars 38 and 38' disposed coaxially on rear bar 37 on either side of collars 29 and 29', respectively, and secured to the bar by means of set screws 39 and 39' respectively.

As shown in FIGS. 6 and 7, a connecting member 40 mounting a wheel 41 is clamped to one end of bar 37 by a clamp 42, and a similar connecting member 43 and wheel 44 are clamped to the other end of bar 37 by clamp 45, as shown in FIG. 1, to provide running gear for the mower.

It will be seen by those skilled in the art that modules 11 and 12 are thus interconnected in abutting lateral relationship to provide a rotary mower of extended width. It will be likewise understood that additional like modules may be laterally connected together to further increase the width of the mower to provide an optimum cutting swath by merely increasing the lengths of front bar 31 and rear bar 37.

Furthermore, by providing modules of two different sizes, a variety of machine width configurations may be obtained by selective combinations of such modules. Modules 11 and 12 have been described as representative of larger and smaller sized modules respectively. It has been found practical for module 11 to be about 5½ feet wide and module 12 to be about 4½ feet wide. Module 11 will be referred to as an "L" module and module 12 will be referred to as an "S" module. It is to be understood that these references to size refer primarily to the width of the modules, which is transverse to the direction the machine moves when it is mowing.

Figure 2:
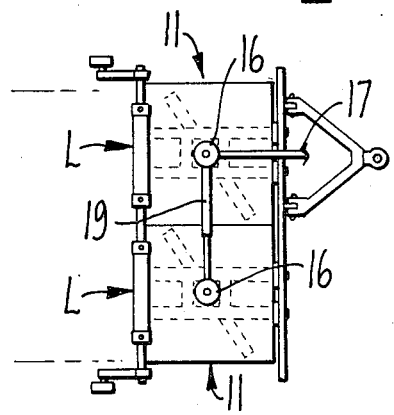
FIG. 2 is a plan view of a rotary mower embodying the present invention in a two-modular wide configuration.
Figure 3:
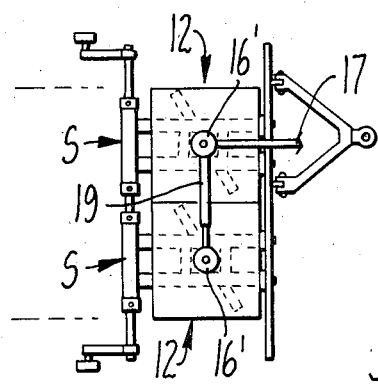
FIG. 3 is a plan view of a rotary mower of the present invention in a two-modular narrow configuration.

It will be obvious that when only a narrow mowing machine is required or desired, a single L or S module may be employed as desired thereby producing a cutting width of either 4½ or 5½ feet. FIG. 2 illustrates how two L modules may be combined to provide a mowing machine having an overall effective width of about 11 feet. In like manner, FIG. 3 illustrates how two S modules may be combined to provide a mowing machine having an overall effective width of about 9 feet.

It will be obvious that an L module and an S module may be combined, as shown in FIG. 1, to provide an overall effective machine width of about 10 feet.

FIG. 8 illustrates a machine comprising a central L module bounded on either side by an S module to provide a machine having an overall width of about 14½ feet. It will be apparent that other combinations of L modules and S modules will provide a machine having other overall width dimensions.

I claim:

1. A modular constructed rotary mower comprising:
   a. a plurality of interchangeable structural modules each having a front side and a rear side in opposed parallel relationship with said front side, the length of said front side and said rear side defining the width of said structural modules;
   b. a gearbox assembly mounted on each structural modules;
   c. a shaft depending from said gearbox assembly;
   d. a rotary mower blade mounted on said shaft;
   e. power transmission means for drivingly connecting said gearbox assembly with a source of power;
   f. a front bar attached to the front side of each of said structural modules for interconnecting the front sides thereof;
   g. a rear bar attached to the rear side of each of said structural modules for interconnecting the rear sides thereof;
   h. hitch means attached to said front bar; and running gear attached to said rear bar.

2. The invention of claim 1 wherein each structural modules comprise first parallel spaced longitudinal beam members extending from the front side of the module to the rear side thereof, and second parallel spaced transverse beam members, said first and second parallel beam members forming an H frame.

3. The invention of claim 2 wherein each structural modules further comprise a mounting plate attached centrally of said H frame between said first parallel beam members and between said second parallel beam members and mounting said gearbox assembly.

4. The invention of claim 2 wherein each structural modules further comprise a front frame member defining said front side attached to a front end of each of said first parallel beam members and parallel to said second parallel beam members,
   a. a side frame member attached to each end of said front frame member and extending rearwardly parallel to said first parallel beam members,
   b. and a rear frame member defining said rear side attached to the rearward end of each of said side frame members and parallel to said front frame member, whereby said front, side and rear frame members enclose the mower blade, and wherein said front bar is attached to each said front frame member.

5. The invention of claim 2 wherein each structural modules further comprise a tubular sleeve attached to the rearward ends of said first parallel beam members and transverse therewith, and wherein said rear bar extends coaxially through each tubular sleeve and it restrained longitudinally with respect thereto.

6. The invention of claim 1 wherein said modules comprise at least two modules having different widths.

7. The invention of claim 1 wherein said modules comprise at least two modules having the same width.

* * * * *